US00RE38843E

(19) United States
(12) Reissued Patent
Forster

(10) Patent Number: US RE38,843 E
(45) Date of Reissued Patent: Oct. 25, 2005

(54) HYDROSTATIC SLEWING DRIVE

(75) Inventor: Franz Forster, Karlstadt-Mühlbach (DE)

(73) Assignee: Linde Aktiengesellschaft (DE)

(21) Appl. No.: 10/887,554

(22) Filed: Jul. 8, 2004

Related U.S. Patent Documents

Reissue of:
(64) Patent No.: 6,604,450
Issued: Aug. 12, 2003
Appl. No.: 09/877,300
Filed: Jun. 8, 2001

(30) Foreign Application Priority Data

Jun. 10, 2000 (DE) ..... 100 28 825

(51) Int. Cl.[7] ..... F15B 15/26
(52) U.S. Cl. ..... 92/19; 92/26; 92/57
(58) Field of Search ..... 92/17, 19, 20, 92/22, 26, 57, 71; 91/499; 60/442

(56) References Cited

U.S. PATENT DOCUMENTS 3,744,377 A * 7/1973 Lauck
6,336,323 B1 * 1/2002 Tanabe et al.

* cited by examiner

*Primary Examiner*—Edward K. Look
*Assistant Examiner*—Michael Leslie
(74) *Attorney, Agent, or Firm*—The Webb Law Firm

(57) ABSTRACT

A hydrostatic slewing drive suitable for use in construction equipment, in particular excavators, has a pinion shaft that is rotationally mounted in a housing. A slewing pinion is connected to the pinion shaft. An axial piston motor that utilizes a swashplate construction is in the housing and has a rotating cylinder block with borings and pistons located in the boring. The cylinder block is in one piece with, or integral with, the pinion shaft. The axial piston motor preferably has a constant flow volume, whereby the swashplate is shaped on a housing component. The pistons are supported by slippers on the swashplate which is provided with hydraulic fluid supply channels to which borings in the slippers and in the piston can be connected. The slewing piston can be detachably fastened to the pinion shaft/cylinder block. There is also a brake that can be actively connected with the pinion shaft/cylinder block. The brake, which is a wet, spring-loaded, multiple-disc brake, is preferably located next to the swashplate base and is connected in rotational synchronization with the pinion shaft/cylinder block by a torsion rod. At least one valve, in particular a control valve, is located between the swashplate and the swashplate base.

20 Claims, 1 Drawing Sheet

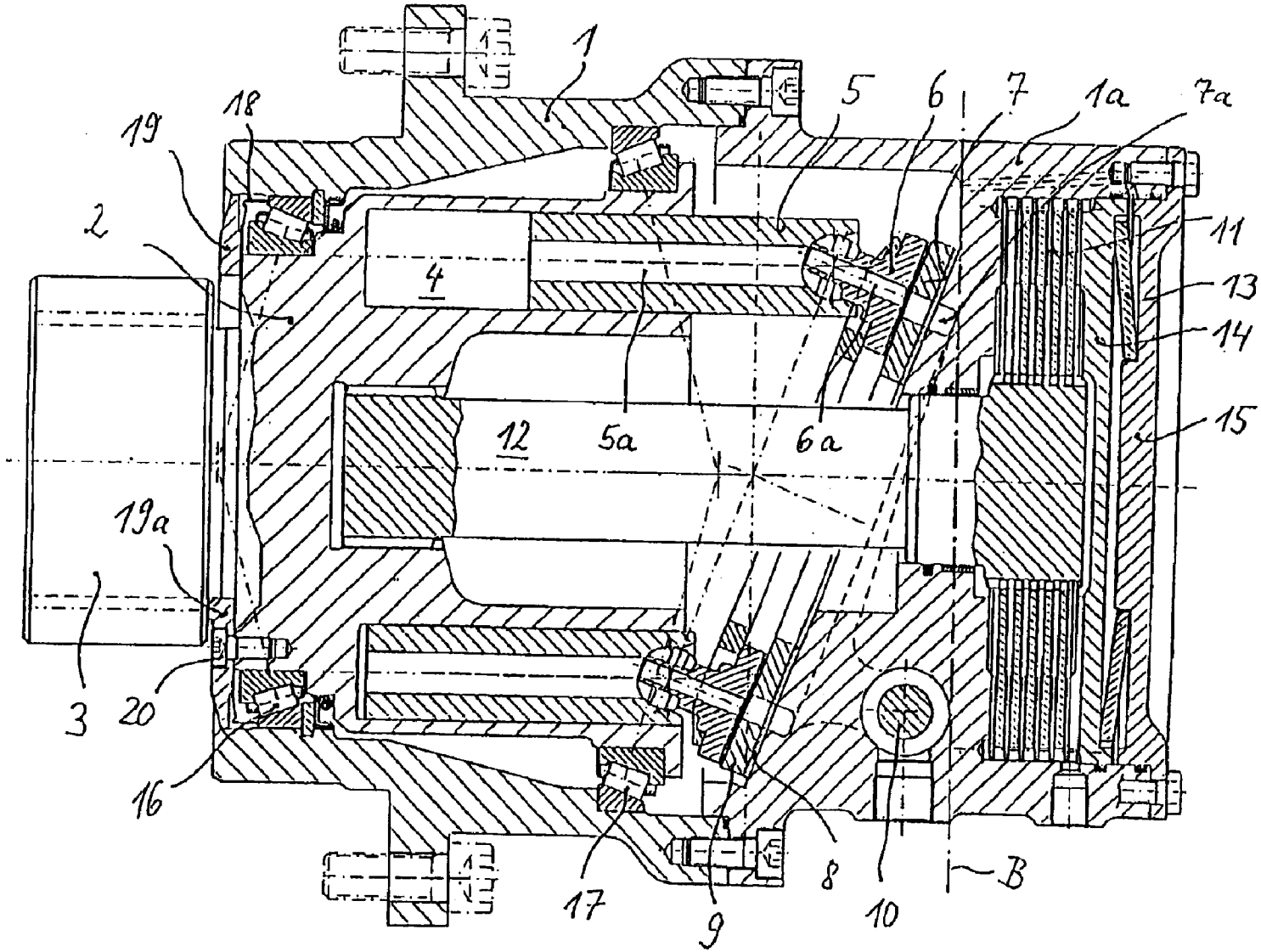
7a
11
13
14
15
1a
7
6
5
6a
5a
12
4
1
18
19
2
19a
20
3
16
17
9
8
10
B

HYDROSTATIC SLEWING DRIVE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a hydrostatic rotary drive suitable for use in construction equipment, such as excavators, with a pinion shaft that is rotationally mounted in a housing, a slewing pinion that is connected to the pinion shaft and an axial piston motor that uses the swashplate construction and has a rotating cylinder block with borings and pistons located in said borings.

2. Background Information

The slewing drives of the prior art for excavators generally consist of a high-speed axial piston power unit, a downstream one-stage or two-stage step-down gearing and a pinion shaft with a slewing pinion connected axially to it. A brake is also located between the axial piston power unit and the step-down gearing. Slewing drives of this type have been manufactured and sold since 1985 by Linde AG, Industrial Trucks and Hydraulics Division, Aschaffenburg.

The object of the invention is to make available a hydrostatic slewing drive of the type described above that has compact dimensions and is easy and economical to manufacture and install.

SUMMARY OF THE INVENTION

The invention includes a cylinder block that is integral, or in one piece, with the pinion shaft.

With the direct drive of the invention, there is no need for a step-down gearing, which requires a corresponding sizing of the axial piston motor for adequate flow passing. Further, in the invention, the pinion shaft bearing system assumes the function of the cylinder block bearing system. The cylinder block of the invention may have an extended bracket, as a result of which there is enough space available for a sufficiently large flow volume to be able to operate the axial piston motor as a low-speed engine (approximately 100 rpm). The invention achieves compact dimensions of the slewing drive and a significant reduction in the number of components, and thereby results in a drastic simplification of manufacture and assembly.

In one embodiment of the invention, the axial piston motor has a constant flow volume and the swashplate is formed on a housing component, which further minimizes the effort and expense of manufacture. The entire unit also takes up less space.

The admission and discharge of the hydraulic fluid to and from the borings of the cylinder block of the axial piston motor is very simple in one configuration of the invention. Specifically, the pistons may be supported by slippers on the swashplate. The swashplate may be provided with hydraulic fluid feed channels which can be connected to borings in the slippers and in the pistons. In this manner, no special control base receptacle is necessary, as is the case in the hydrostatic slewing drives of the prior art.

If the slewing pinion is detachably fastened to the pinion shaft/cylinder block, it can be replaced when it becomes worn. In this case, the pinion shaft/cylinder block can be reused.

The slewing drive of the invention may be provided with a brake that can be effectively connected with the pinion shaft/the cylinder block. The brake can straddle the cylinder block, for example. In one advantageous possible embodiment, the brake is located next to the swashplate base, and is connected in rotational synchronization with the pinion shaft/cylinder block by a torsion rod. As a result of this construction, it is not necessary to dismantle the axial piston motor to remove the brake. The torsion bar is a shaft that is subjected exclusively to torsion stress and can therefore be very slender. Further, when the brake is a wet, spring-loaded, multiple-disc brake, advantages are achieved with regard to the efficient utilization of space and increased efficiency.

The efficient utilization of space is further improved if there is at least one valve, in particular a control valve, between the swashplate and the swashplate base. The swashplate base is a plane perpendicular to the center axis, from which plane the swashplate projects axially toward the pinion shaft/the cylinder block.

In one configuration of the invention, the pinion shaft/the cylinder block is mounted in the housing by two helical bearings, in particular tapered roller bearings in an O-arrangement. This construction makes the absorption of large forces possible, including both internal power unit forces and external gearing forces.

A seal or sealing mechanism may be located between the pinion shaft/cylinder block and the housing in an area of the pinion shaft/cylinder block which is next to the slewing pinion. The seal or sealing mechanism can be replaced without having to remove the pinion shaft/cylinder block. This ability to replace the seal or sealing mechanism can be accomplished, for example, by using a detachable slewing pinion. If the slewing pinion is non-detachably connected with the pinion shaft/cylinder block, however, the seal or sealing mechanism may be in contact against a support and in the shape of an annular disc. Further, the seal or sealing mechanism and the support can be pushed over the slewing pinion.

Additional advantages and details of the invention are explained in greater detail below with reference to the exemplary embodiment illustrated in the accompanying schematic FIGURE wherein like reference numerals represent like elements throughout.

BRIEF DESCRIPTION OF THE DRAWING

The FIGURE is a schematic sectional view of a hydrostatic slewing drive according to the present invention.

DETAILED DESCRIPTION OF THE PREFERRED EMBODIMENTS

The hydrostatic slewing drive of the invention is shown in the FIGURE and has a housing 1. A pinion shaft 2 is mounted in the housing 1 with a slewing pinion 3 connected to the pinion shaft 2. In this exemplary embodiment, the slewing pinion 3 is in one piece with (i.e., integral with) the pinion shaft 2. It is also possible, however, to fasten the slewing pinion 3 detachably to the pinion shaft 2, so that when the slewing pinion 3 becomes worn it can be replaced individually. In this alternative construction, the torque is transmitted from the pinion shaft 2 to the slewing pinion 3, for example by an axial gearing.

The pinion shaft 2 is realized in the form of a cylinder block of a hydrostatic axial piston motor in a swashplate construction. In other words, the cylinder block of the axial piston motor provided as the drive is in one piece with the pinion shaft 2. The result is a direct drive with which no step-down gearing is necessary. The pinion shaft 2 will also be referred to as a cylinder block component 2.

In the joint pinion shaft/cylinder block component 2, there are borings 4 with pistons 5 located in the borings 4. The pistons 5 are supported by slippers 6 on a swashplate 7, into which hydraulic fluid feed channels 7a have been provided.

Because in this exemplary embodiment, the axial piston motor has a constant flow volume, the swashplate 7 is shaped on a cover-like housing component 1a that is detachably connected with the housing 1. Between the swashplate 7 and the slippers 6 there are a control plate 8, into which control cams are worked, and a plate 9 having pierced apertures.

For the feed and discharge of hydraulic fluid, there are borings 5a and 6a in the pistons 5 and in the slippers 6, respectively, which are periodically connected with the hydraulic fluid feed channels 7a.

There is at least one valve 10, preferably a control valve, in the area between the swashplate 7 and the swashplate base B. The swashplate base B is a plane from which the swashplate 7 projects axially toward the pinion shaft/cylinder block 2. The space available in the axial piston motor is thereby utilized optimally. If necessary, the housing component 1a can also be formed with a rectangular cross section for easier installation of the valve 10 (and optionally of additional valves).

Next to the swashplate base B is a brake 11 that is a wet, spring-loaded, multiple-disc brake. The brake 11 is synchronously connected with the joint pinion shaft/cylinder block component 2 by a torque rod 12 coupled to the block component 2. The brake 11 is pressurized in the closing direction by a belleville spring washer 13 with the interposition of a brake piston 14. The brake piston 14 can be pushed in the direction opposite to the closing direction by hydraulic pressure, as a result of which the brake 11 can be released. A threaded end plate 15 acts as an abutment for the belleville spring washer 13 and makes possible an easy installation or removal of the brake 11.

The pinion shaft/cylinder block component 2 is mounted in the housing 1 by two tapered roller bearings 16, 17 in an O-arrangement. Between the pinion shaft/cylinder block 2 and the housing 1, in an area of the pinion shaft/cylinder block 2 that is next to the slewing pinion 3, there is a sealing mechanism in the form of a gasket 18 which is in contact against a support 19 in the shape of an annular disc. The gasket 18 and the support 19 can be pushed over the slewing pinion 3. The support 19 is fastened by a plurality of inward-pointing shaped-on tabs 19a that are aligned with recesses between the individual teeth of the slewing pinion 3, and at this point the support 19 can be fastened to the pinion shaft/cylinder block 2 by screws 20. In this manner the gasket 18 can be replaced without having to dismantle the axial piston motor.

The tapered roller bearings 16, 17 are biased by a shim ring (not shown in the FIGURE) between the tapered roller bearing 16 on the left in the FIGURE and the support 19.

It will be apparent to those of ordinary skill in the art that various modifications may be made to the present invention without departing from the spirit and scope thereof. The scope of the present invention is defined by the appended claims and equivalents thereto.

What is claimed is:

1. A hydrostatic slewing drive comprising:

a housing;

an intergral pinion shaft and rotating cylinder block having borings that is rationally mounted in the housing, wherein the pinion shaft and rotating cylinder block is mounted by two helical roller bearings in an O-arrangement in the housing;

a slewing pinion connected connected to the pinion shaft and rotating cylinder block; and an axial piston motor that utilizes a swashplate in the housing, the axial piston motor having pistons located in the borings of the rotating cylinder block and pinion shaft.

2. The hydrostatic slewing drive as claimed in claim 1, wherein the axial piston motor has a constant flow volume and the swashplate is on a housing component.

3. The hydrostatic slewing drive as claimed in claim 1, wherein the pistons are supported by slippers on the swashplate, and wherein the swashplate is provided with hydraulic fluid feed channels to which feed borings in the slippers and in the pistons can be connected.

4. The hydrostatic slewing drive as claimed in claim 1, wherein the slewing pinion is detachably fastened to the pinion shaft.

5. The hydrostatic slewing drive as claimed in claim 1, further including a brake that can be effectively connected with the pinion shaft.

6. The hydrostatic slewing drive as claimed in claim 5, wherein the brake is a wet, spring-loaded, multiple-disc brake.

7. A hydrostatic slewing drive comprising:

a housing;

an intergral pinion shaft and rotating cylinder block having borings that is rotationally mounted in the housing;

a slewing pinion connected to the pinion shaft and rotating cylinder block;

an axial piston motor that utilizes a swashplate in the housing, the axial piston motor having pistons located in the borings of the rotating cylinder block and pinion shaft; and a brake that can be effectively connected with the pinion shaft and rotating cylinder block, wherein the brake is located next to a swashplate base and is synchronously connected by a torsion rod housing with the pinion shaft and rotating cylinder block.

8. A hydrostatic slewing drive comprising:

a housing;

an intergral pinion shaft and rotating cylinder block having borings that is rationally mounted in the housing;

a slewing pinion connected to the pinion shaft and rotating cylinder block;

an axial piston motor that utilizes a swashplate in the, the axial piston motor having pistons located in the borings of the rotating cylinder block and pinion shaft; and at least one valve between the swashplate and the swashplate base.

9. The hydrostatic slewing drive as claimed in claim 8, wherein the pinion shaft and rotating cylinder block is mounted by two helical roller bearings in an O-arrangement in the housing.

10. A hydrostatic slewing drive comprising:

a housing;

an intergral pinion shaft and rotating cylinder block having borings that is rationally mounted in the housing;

a slewing pinion connected to the pinion shaft and rotating cylinder block;

an axial piston motor that utilizes a swashplate in the, the axial piston motor having pistons located in the borings of the rotating cylinder block and pinion shaft; and a seal mechanism that can be replaced without removing the pinion shaft and rotating cylinder block positioned between the intergral pinion shaft and rotating cylinder block and the housing in an area of the pinion shaft and rotating cylinder block that is next to the slewing pinion.

11. The hydrostatic slewing drive as claimed in claim 10, wherein the seal mechanism is in contact against a support in the shape of an annular disc, and wherein the seal mechanism and the support can be pushed over the slewing pinion.

12. A hydrostatic slewing drive comprising:

a housing;

a one piece pinion shaft and rotating cylinder block having borings that is rationally mounted in the housing;

a slewing pinion connected to the pinion shaft and rotating cylinder block; and an axial piston motor that utilizes a swashplate in the housing, the axial piston motor having pistons located in the borings of the rotating cylinder block and pinion shaft.

13. The hydrostatic slewing drive as claimed in claim 12, wherein the axial piston motor has a constant flow volume and the swashplate is on a housing component.

14. The hydrostatic stewing drive as claimed in claim 12, wherein the pistons are supported by slippers on the swashplate, and wherein the swashplate is provided with hydraulic fluid feed channels to which feed borings in the slippers and in the pistons can be connected.

15. The hydrostatic slewing drive as claimed in claim 12, wherein the slewing pinion is detachably fastened to the pinion shaft and rotating cylinder block.

16. The hydrostatic slewing drive as claimed in claim 12, further including a brake that can be effectively connected with the pinion shaft and rotating cylinder block.

17. The hydrostatic stewing drive as claimed in claim 16, wherein the brake is a wet, spring-loaded, multiple-disc brake.

18. The hydrostatic stewing drive as claimed in claim 16, further including at least one valve between the swashplate and a swashplate base.

19. The hydrostatic stewing drive as claimed in claim 16, wherein the pinion shaft is mounted by two helical roller bearings in an O-arrangement in the housing.

20. The hydrostatic stewing drive as claimed in claim 16, further including a seal mechanism that can be replaced without removing the pinion shaft/cylinder block positioned between the pinion shaft and the housing in an area of the pinion shaft that is next to the stewing pinion.

* * * * *

UNITED STATES PATENT AND TRADEMARK OFFICE

CERTIFICATE OF CORRECTION

PATENT NO. : RE 38,843 E
APPLICATION NO. : 10/887554
DATED : October 25, 2005
INVENTOR(S) : Forster It is certified that error appears in the above-identified patent and that said Letters Patent is hereby corrected as shown below:

Column 3, Line 67, in Claim 1, “rationally mounted” should read -- rotationally mounted --.

Column 4, Line 4, in Claim 1, “connected connected to the pinion” should read -- connected to the pinion --.

Column 4, Line 50, in Claim 8, “rationally mounted” should read -- rotationally mounted --.

Column 4, Lines 52-53, in Claim 8, “in the, the” should read -- in the housing, the axial piston --.

Column 4, Line 64, in Claim 10, “rationally mounted” should read -- rotationally mounted --.

Column 5, Lines 1-2, in Claim 10, “in the, the” should read -- in the housing, the axial piston --.

Column 5, Line 18, in Claim 12, “rationally mounted” should read -- rotationally mounted --.

Column 6, Line 1, in Claim 14, “stewing drive” should read -- slewing drive --.

Column 6 Line 13, in Claim 17 “stewing drive” should read -- slewing drive --.

Column 6 Line 16, in Claim 18 “stewing drive” should read -- slewing drive --.

Column 6 Line 19, in Claim 19 “stewing drive” should read -- slewing drive --.

UNITED STATES PATENT AND TRADEMARK OFFICE

CERTIFICATE OF CORRECTION

PATENT NO. : RE 38,843 E
APPLICATION NO. : 10/887554
DATED : October 25, 2005
INVENTOR(S) : Forster It is certified that error appears in the above-identified patent and that said Letters Patent is hereby corrected as shown below:

Column 6 Line 23, in Claim 20 “stewing drive” should read -- slewing drive --.

Column 6 Line 27, in Claim 20 “stewing pinion” should read -- slewing pinion --.

Signed and Sealed this

Eighth Day of August, 2006

JON W. DUDAS
*Director of the United States Patent and Trademark Office*